United States Patent
Mukasa

(10) Patent No.: US 12,153,256 B2
(45) Date of Patent: Nov. 26, 2024

(54) OPTICAL FIBER CABLE

(71) Applicant: FURUKAWA ELECTRIC CO., LTD., Tokyo (JP)

(72) Inventor: Kazunori Mukasa, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 42 days.

(21) Appl. No.: 17/220,969

(22) Filed: Apr. 2, 2021

(65) Prior Publication Data

US 2021/0223475 A1   Jul. 22, 2021

Related U.S. Application Data

(63) Continuation of application No. PCT/JP2019/040609, filed on Oct. 16, 2019.

(30) Foreign Application Priority Data

Oct. 19, 2018 (JP) .................................. 2018-197973

(51) Int. Cl.
*G02B 6/255* (2006.01)
*G02B 6/36* (2006.01)
(Continued)

(52) U.S. Cl.
CPC ............. *G02B 6/255* (2013.01); *G02B 6/368* (2013.01); *G02B 6/3801* (2013.01); *G02B 6/2551* (2013.01); *G02B 6/448* (2013.01)

(58) Field of Classification Search
None
See application file for complete search history.

(56) References Cited

U.S. PATENT DOCUMENTS 3,612,660 A * 10/1971 Miller ..................... G07F 7/08
                                                                341/87
3,778,157 A * 12/1973 Brelot ................. G01B 11/026
                                                                385/119

(Continued)

FOREIGN PATENT DOCUMENTS

JP    62-161107 A    7/1987
JP    63-065412 A    3/1988

(Continued)

OTHER PUBLICATIONS

Murata, Hiroshi "Handbook of Optical Fibers and Cables", Marcel Dekker, Inc., 1988, p. 19 (Year: 1988).*

(Continued)

*Primary Examiner* — Michelle R Connelly
(74) *Attorney, Agent, or Firm* — Oblon, McClelland, Maier & Neustadt, L.L.P.

(57) ABSTRACT

An optical fiber cable includes: a small-diameter optical fiber including a core and a cladding portion made of glass and having a cladding diameter of 120 μm or less; a normal optical fiber that is optically connected to at least one end of the small-diameter optical fiber, includes a core and a cladding portion made of glass, and has a cladding diameter conforming to a standard of 125 μm; an optical coupling mechanism provided between the small-diameter optical fiber and the normal optical fiber; and a sheath covering an outer periphery of the small-diameter optical fiber only, among the small-diameter optical fiber and the normal optical fiber. Further, the end of the small-diameter optical fiber is positioned outside the sheath.

10 Claims, 6 Drawing Sheets

(51) Int. Cl.
  *G02B 6/38* (2006.01)
  *G02B 6/44* (2006.01)

(56) References Cited

U.S. PATENT DOCUMENTS

| | | | | |
|---|---|---|---|---|
| 6,244,757 | B1 * | 6/2001 | Kim | G02B 6/2552 |
| | | | | 385/95 |
| 6,584,257 | B1 * | 6/2003 | Hurley | G02B 6/4471 |
| | | | | 385/109 |
| 6,655,857 | B2 * | 12/2003 | Allan | G02B 6/2551 |
| | | | | 385/96 |
| 6,921,216 | B1 * | 7/2005 | Li | G02B 6/2551 |
| | | | | 219/121.13 |
| 6,939,060 | B2 * | 9/2005 | Tamura | G02B 6/2551 |
| | | | | 359/341.1 |
| 7,920,763 | B1 * | 4/2011 | Shou | G02B 6/32 |
| | | | | 385/33 |
| 9,348,087 | B1 * | 5/2016 | Zhang | C03B 37/01807 |
| 9,989,699 | B2 * | 6/2018 | Bennett | G02B 6/0286 |
| 10,185,105 | B2 * | 1/2019 | Risch | G02B 6/448 |
| 2001/0038737 | A1 | 11/2001 | Imada et al. | |
| 2002/0094180 | A1 * | 7/2002 | Antos | G02B 6/2835 |
| | | | | 385/127 |
| 2003/0059180 | A1 | 3/2003 | Tamura et al. | |
| 2004/0022503 | A1 * | 2/2004 | Okazaki | G02B 6/425 |
| | | | | 385/96 |
| 2004/0131321 | A1 * | 7/2004 | Kubo | G02B 6/0281 |
| | | | | 385/124 |
| 2004/0213526 | A1 * | 10/2004 | Inoue | G02B 6/2551 |
| | | | | 385/96 |
| 2007/0122084 | A1 | 5/2007 | Stephen | |
| 2009/0190884 | A1 * | 7/2009 | Shimotsu | G02B 6/14 |
| | | | | 385/43 |
| 2011/0317966 | A1 * | 12/2011 | Kumkar | G02B 6/2558 |
| | | | | 385/95 |
| 2014/0079354 | A1 | 3/2014 | Aoki et al. | |
| 2018/0045888 | A1 * | 2/2018 | He | G02B 6/036 |

FOREIGN PATENT DOCUMENTS

| | | | |
|---|---|---|---|
| JP | 08-122577 A | | 5/1996 |
| JP | 10206659 A | * | 8/1998 ......... G02B 6/03627 |
| JP | 2001-350037 A | | 12/2001 |
| JP | 2004-126033 A | | 4/2004 |
| JP | 2004325990 A | * | 11/2004 .......... G02B 6/2551 |
| JP | 2004-361846 A | | 12/2004 |
| JP | 2005189813 A | * | 7/2005 |
| JP | 2005-308880 A | | 11/2005 |
| JP | 2006-323027 A | | 11/2006 |
| JP | 2007-101902 A | | 4/2007 |
| JP | 2009-175506 A | | 8/2009 |
| JP | 2011099926 A | * | 5/2011 |
| JP | 2012-513613 A | | 6/2012 |
| JP | 2014-059479 A | | 4/2014 |
| JP | 2017-032932 A | | 2/2017 |

OTHER PUBLICATIONS

"Furukawa Electric Develops Thin Ultra-high Count Multi-core Optical Fiber Cable with the World's Highest Core Density", URL: http://www.furukawa.co.io/release/2018/cornm_180330.html, Mar. 30, 2018, 4 pages (with English Translation).

Notice of Reasons for Refusal dated Jul. 11, 2023, issued in corresponding Japanese patent application No. 2020-553219 (with English translation).

Japanese Office Action issued Nov. 28, 2023 in Japanese Application 2020-553219, (with unedited computer-generated English translation), 6 pages.

International Search Report issued Dec. 10, 2019 in PCT/JP2019/040609 filed on Oct. 16, 2019, 2 pages.

"Furukawa Electric Develops Thin Ultra-high Count Multi-core Optical Fiber Cable with the World's Highest Core Density", URL: http://www.furukaw.co.io/release/2018/comm_180330.html, Mar. 30, 2018, 4 pages (with English Translation).

Extended European Search Report issued on May 16, 2022 in European Patent Application No. 19872467.6, 7 pages.

* cited by examiner

LONGITUDINAL
DIRECTION

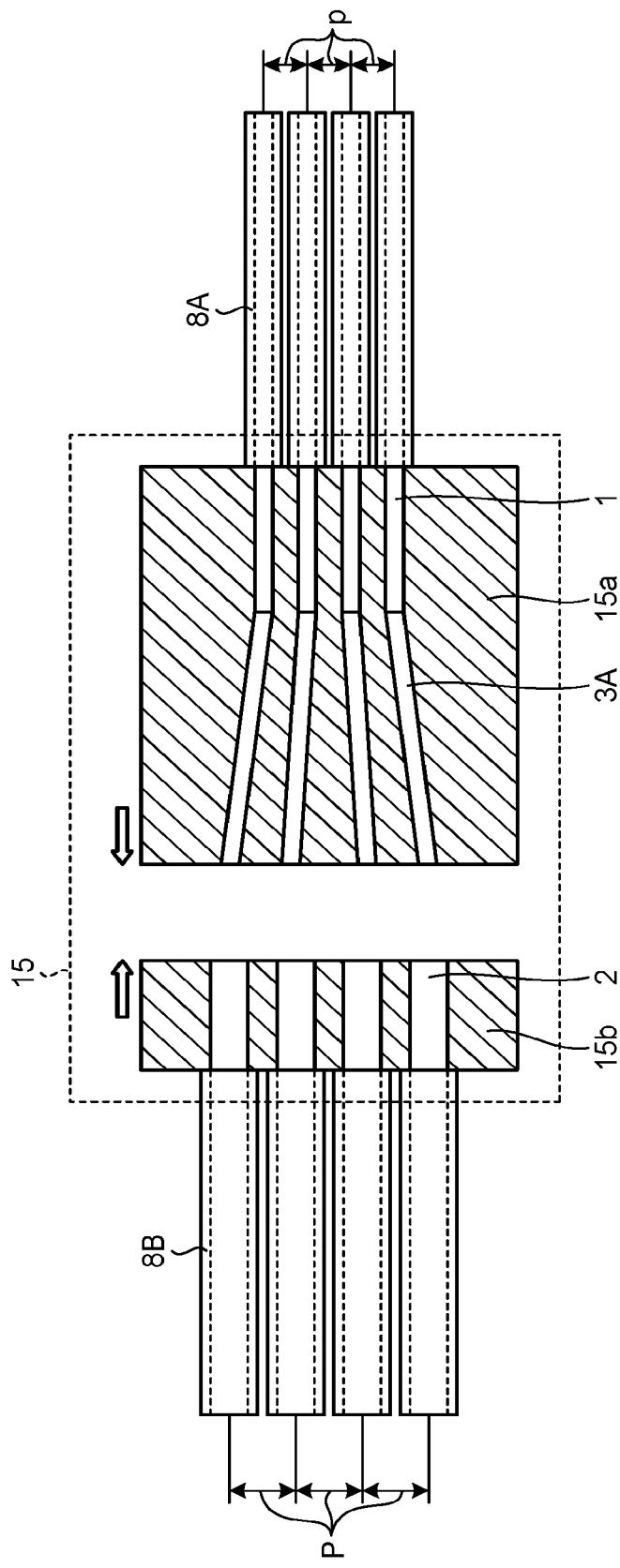

OPTICAL FIBER CABLE

CROSS-REFERENCE TO RELATED APPLICATION(S)

This application is a continuation of International Application No. PCT/JP2019/040609, filed on Oct. 16, 2019 which claims the benefit of priority of the prior Japanese Patent Application No. 2018-197973, filed on Oct. 19, 2018, the entire contents of which are incorporated herein by reference.

BACKGROUND

The present disclosure relates to an optical fiber cable.

In the field of optical communication such as data communication and telecommunication, small-diameter optical fibers are of interest as optical fibers for achieving high-density optical fiber cables (see FURUKAWA ELECTRIC CO., LTD., "Development of Small Diameter Super Multi-Core Optical Fiber Cable Having World's Highest Core Density", [online], Mar. 30, 2018, [searched on Sep. 24, 2018], the Internet <URL: http://www.furukawa.co.jp/release/2018/comm_180330.html>). The "small-diameter optical fiber" is an optical fiber having a glass part whose diameter is reduced, and can be defined as an optical fiber with a cladding diameter smaller than a diameter of 125 μm in the related art. Note that the definition of the small-diameter optical fiber also includes an optical fiber in which both the cladding diameter and an outer diameter including a strand coating formed around a cladding portion are reduced.

In the related art, various technologies have been disclosed for connecting such small-diameter optical fibers to other optical fibers (Japanese Laid-open Patent Publication Nos. S63-065412, H08-122577, 2007-101902, 2009-175506, and 2011-099926). Other optical fibers include, for example, normal optical fibers that conform to a typical single-mode optical fiber standard defined in G.652 developed by International Telecommunication Union Telecommunication Standardization Sector (ITU-T) (hereinafter referred to as G.652 standard).

SUMMARY

There is a need for providing an optical fiber cable that can be increased in density and is easy to handle.

According to an embodiment, an optical fiber cable includes: a small-diameter optical fiber including a core and a cladding portion made of glass and having a cladding diameter of 120 m or less; a normal optical fiber that is optically connected to at least one end of the small-diameter optical fiber, includes a core and a cladding portion made of glass, and has a cladding diameter conforming to a standard of 125 μm; an optical coupling mechanism provided between the small-diameter optical fiber and the normal optical fiber; and a sheath covering an outer periphery of the small-diameter optical fiber only, among the small-diameter optical fiber and the normal optical fiber. Further, the end of the small-diameter optical fiber is positioned outside the sheath.

BRIEF DESCRIPTION OF DRAWINGS

FIG. 11 is a schematic diagram illustrating a sixth configuration example of an optical coupling mechanism.

DETAILED DESCRIPTION

Figure 1:
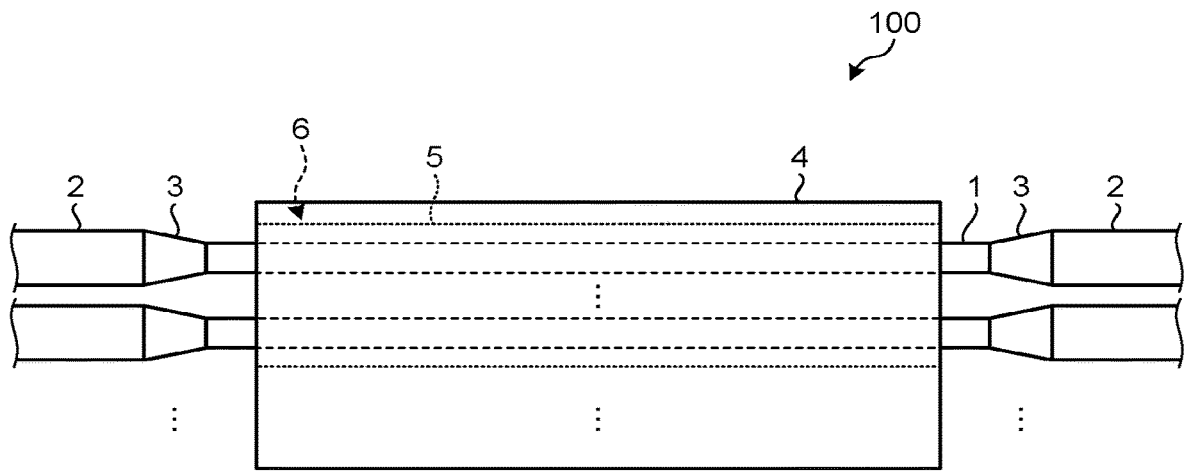
FIG. 1 is a schematic configuration diagram of an optical fiber cable according to a first embodiment.

Japanese Laid-open Patent Publication Nos. S63-065412, H08-122577, 2007-101902, 2009-175506, and 2011-099926 relate to a technology for connecting small-diameter optical fibers. None of Patent Literatures, however, disclose an optimum overall configuration for practical use of an optical fiber cable using an optical fiber having a glass part whose diameter is reduced.

For example, as the inventors have studied intensively, when an optical fiber cable using a small-diameter optical fiber is laid, for example, it has been necessary in the related art to take out the small-diameter optical fiber from an end thereof and handle the same for connection to the optical fiber cable and equipment that have already been laid.

However, for such a small-diameter optical fiber, there is room for improvement in terms of handling because it is generally impossible to use a splicing tool, splicing conditions, and so on that are prepared and optimized for a normal optical fiber.

Hereinafter, embodiments of the present disclosure are detailed with reference to the drawings. Note that the present disclosure is not limited to the embodiments described below. Further, in the drawings, the same or corresponding constituent elements are indicated with the same sign as appropriate. Further, in this specification, a cutoff wavelength (Cutoff wavelength) means a cable cutoff wavelength defined in ITU-T G.650.1. Further, for other terms not particularly defined herein, the definitions and measurement methods in G.650.1 and G.650.2 shall be followed.

First Embodiment

FIG. 1 is a schematic configuration diagram of an optical fiber cable according to a first embodiment. An optical fiber cable 100 includes a plurality of small-diameter optical fibers 1, a plurality of normal optical fibers 2, a plurality of splicing optical fibers 3, and a sheath 4.

Figure 2A:
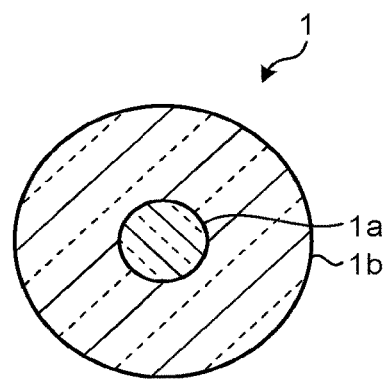
FIG. 2A is a schematic diagram of a cross-section of a small-diameter optical fiber.
Figure 2B:
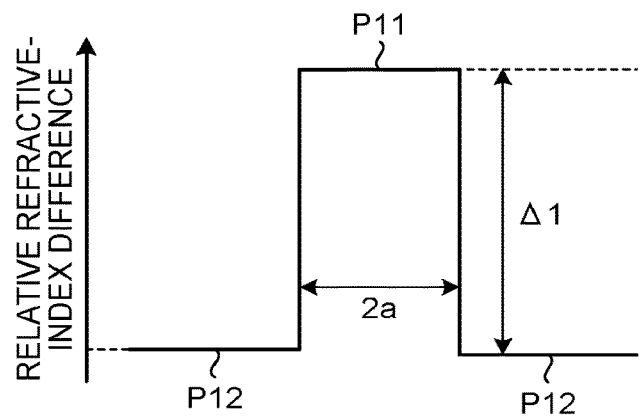
FIG. 2B is a schematic diagram of a refractive index profile of the small-diameter optical fiber.

FIG. 2A illustrates a cross-section of a small-diameter optical fiber, and FIG. 2B illustrates a refractive index profile of the small-diameter optical fiber. The small-diameter optical fiber 1 includes a core 1a at the approximate center thereof and a cladding portion 1b formed around the outer periphery of the core 1a. The core 1a and the cladding portion 1b are both made of silica glass. For example, the core 1a is made of silica glass with which germanium (Ge) or the like, which is dopant for increasing the refractive index, is doped. The cladding portion 1b has a refractive index lower than the refractive index of the core 1a. The cladding portion 1b is made of pure silica glass that includes no dopant for adjusting the refractive index, such as Ge or fluorine (F), for example.

The small-diameter optical fiber 1 has a cladding portion with an outer diameter (cladding diameter) of 120 μm or less, and is suitable for increasing the density of the optical fiber cable 100. The cladding diameter of the small-diameter optical fiber 1 is preferably 110 μm or less, and further preferably 100 μm or less.

The small-diameter optical fiber 1 is coated with a resin for example so that the resin covers the outer periphery of the cladding portion 1b. The coating is made of, for example, a UV curable resin, and has a layer structure of one layer or two or more layers. Examples of the UV curable resin include a urethane acrylate resin, a polybutadiene acrylate resin, an epoxy acrylate resin, a silicone acrylate resin, and a polyester acrylate resin; however the UV curable resin is not particularly limited thereto as long as the UV curable resin is used to coat optical fibers. Further, in the small-diameter optical fiber 1, the thickness of the coating is not particularly limited, since the purpose is to reduce the diameter of the core 1a and the cladding portion 1b that are glass parts, and particularly to reduce the cladding diameter. However, the thickness of the coating is preferably thin enough to satisfy the optical characteristics and mechanical characteristics required for the small-diameter optical fiber 1.

In FIG. 2B, a profile P11 shows a refractive index profile of the core 1a, and a profile P12 shows a refractive index profile of the cladding portion 1b. The refractive index profiles are indicated by relative refractive-index differences with respect to the cladding portion 1b. The small-diameter optical fiber 1 has a so-called step-type refractive index profile, the diameter (core diameter) of the core 1a is 2a, and the relative refractive-index difference of the core 1a with respect to the cladding portion 1b is Δ1.

Referring back to FIG. 1, the normal optical fiber 2 is an optical fiber that conforms to G.652 standard, includes a core and a cladding portion made of glass, and has a cladding diameter that is in conformity with 125 μm.

The cladding diameter of the normal optical fiber 2 is therefore 125 μm. According to G.652 standard, since a tolerance of the cladding diameter is ±1 μm (G.652B) or ±0.7 μm (G.652D), the cladding diameter of the normal optical fiber 2 may fall within a range of 125 μm to the tolerance. The normal optical fiber 2 also has a coating made of a resin for example to cover the outer periphery of the cladding portion. The coating is made of, for example, a UV curable resin, and has a layer structure of one layer or two or more layers.

Both ends of each of the small-diameter optical fibers 1 are optically connected to the normal optical fiber 2.

The splicing optical fiber 3 constituting an optical coupling mechanism is a tapered optical fiber with the cladding diameter changing continuously, is provided between each small-diameter optical fiber 1 and each normal optical fiber 2, and is a mechanism for optically coupling each small-diameter optical fiber 1 and each normal optical fiber 2. The splicing optical fiber 3 is an optical fiber fusion-spliced to each of the small-diameter optical fiber 1 and the normal optical fiber 2 in order to join the small-diameter optical fiber 1 and the normal optical fiber 2. The splicing optical fiber 3 has substantially the same cladding diameter as that of the small-diameter optical fiber 1 at an end joined to the small-diameter optical fiber 1, and has substantially the same cladding diameter as that of the normal optical fiber 2 at an end joined to the normal optical fiber 2. The cladding diameter between the both ends of the splicing optical fiber 3 is a value between the cladding diameter of the small-diameter optical fiber 1 and the cladding diameter of the normal optical fiber 2.

The core of the splicing optical fiber 3 has a tapered shape and has, at an end joined to the small-diameter optical fiber 1, substantially the same core diameter as that of the small-diameter optical fiber 1, and, at an end joined to the normal optical fiber 2, substantially the same core diameter as that of the normal optical fiber 2. Further, the splicing optical fiber 3 also has a coating to cover the outer periphery of the cladding portion.

The sheath 4 is configured to cover the outer periphery of each small-diameter optical fiber 1 only, among each small-diameter optical fiber 1 and each normal optical fiber 2. Therefore, the end of the small-diameter optical fiber 1 joined to the normal optical fiber 2 is located outside the sheath 4. The sheath 4 is made of polyethylene colored in black, for example.

Further, in this embodiment, some of the plurality of small-diameter optical fibers 1, for example, four or eight thereof are collectively coated with a ribbon coating 5 to form a plurality of optical fiber ribbon cores 6. The optical fiber cable 100, therefore, may be provided with a slot for accommodating the plurality of optical fiber ribbon cores 6 and a tensile strength member. The slot is made of polyethylene, for example. Further, the tensile strength member is, for example, a steel wire, a steel stranded wire, or an FRP rod made of high tensile fibers or glass fibers integrated with a curable resin.

The optical fiber cable 100 configured as described above in the first embodiment includes the small-diameter optical fiber 1 within the sheath 4; however, does not include the normal optical fiber 2 and the splicing optical fiber 3 having a diameter larger than that of the small-diameter optical fiber 1; therefore increasing the density of the small-diameter optical fiber 1 is possible. Further, since the normal optical fibers 2 constitute both ends of the optical fiber cable 100, a splicing tool, splicing conditions, and so on prepared and optimized for the normal optical fiber can be used as they are when the small-diameter optical fiber 1 is spliced to an optical fiber cable that has already been laid, for example, during installation, etc. As a result, the optical fiber cable 100 has excellent handling properties when the optical fiber cable 100 is laid, etc. Therefore, the density of the optical fiber cable 100 can be increased and the optical fiber cable 100 is easy to handle.

Second Embodiment

Figure 3:
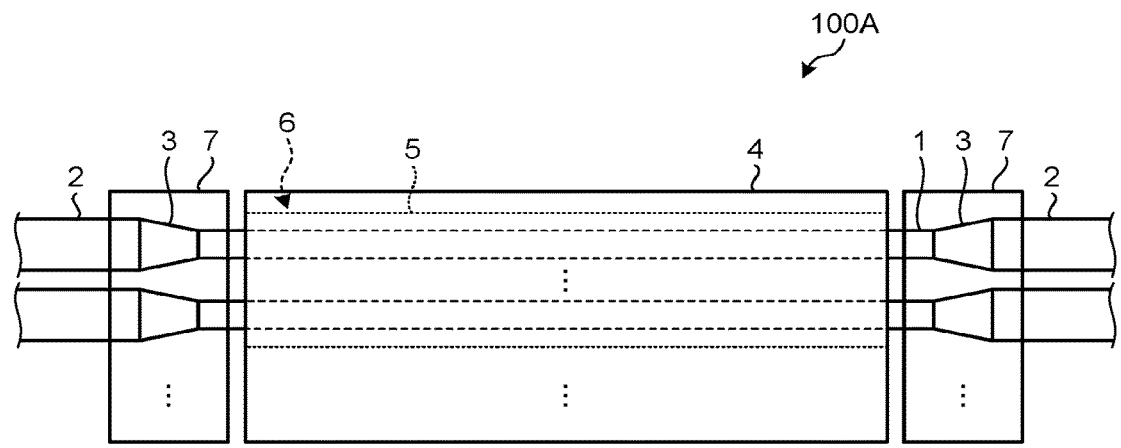
FIG. 3 is a schematic configuration diagram of an optical fiber cable according to a second embodiment.

FIG. 3 is a schematic configuration diagram of an optical fiber cable according to a second embodiment. An optical fiber cable 100A is configured to have the configuration of the optical fiber cable 100 according to the first embodiment illustrated in FIG. 1 and a protective box 7 as a protective part.

The protective box 7 is a box made of a resin and a metal, and collectively accommodates therein each splicing optical fiber 3 constituting the optical coupling mechanism, and a fusion splicing portion for fusion-splicing each splicing optical fiber 3 to each small-diameter optical fiber 1 and each normal optical fiber 2. This enables each splicing optical fiber 3 and the fusion splicing portion to be protected from the outside, and to be prevented from being damaged during handling, for example. As a result, the optical fiber cable 100A is further easy to handle.

The protective part is the protective box 7 in this embodiment; however, the protective part may be a tubular protective tube. The protective tube is made of a resin and a metal, for example, and preferably made of a heat-shrinkable resin. Further, in this embodiment, the protective box 7 collectively accommodates therein each splicing optical fiber 3 and the fusion splicing portion thereof; however, separate protective boxes or protective tubes may contain each splicing optical fiber 3 and the fusion splicing portion thereof. Further, the parts separately contained in the protective tubes may be further collectively contained in a protective box or a protective tube.

Third Embodiment

Figure 4:
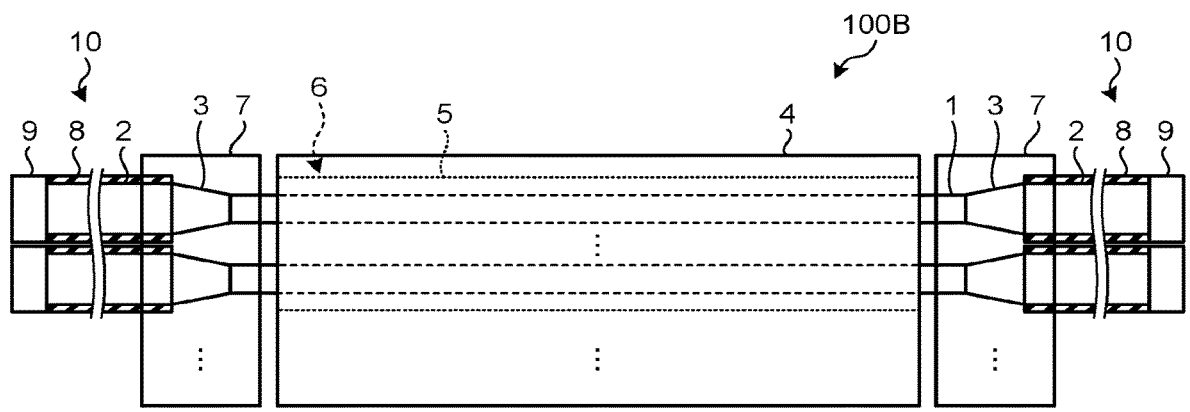
FIG. 4 is a schematic configuration diagram of an optical fiber cable according to a third embodiment.

FIG. 4 is a schematic configuration diagram of an optical fiber cable according to a third embodiment. An optical fiber cable 100B is configured to have the configuration of the optical fiber cable 100A according to the second embodiment illustrated in FIG. 3 and a plurality of cord coatings 8 and a plurality of optical connectors 9.

Each cord coating 8 is provided so as to cover the outer periphery of each normal optical fiber 2. Further, each optical connector 9 is provided at an end of each normal optical fiber 2 opposite to a side where the small-diameter optical fiber 1 is spliced. A tensile strength member made of an aramid resin fiber for example may be provided between each normal optical fiber 2 and each cord coating 8 to cover the outer periphery of each normal optical fiber 2.

In the optical fiber cable 100B, each normal optical fiber 2 is configured as an optical fiber cord with optical connector, and is thus further easy to handle.

Each optical connector 9 is separately provided in each normal optical fiber 2 in this embodiment; however, one multi-core optical connector may be collectively provided in a plurality of normal optical fibers 2. Such an optical connector may be a multi-core connector such as a multi-fiber push on (MPO) connector.

Further, in the embodiments described above, the tapered splicing optical fiber 3 may be replaced with a splicing optical fiber having a constant cladding diameter and a constant core diameter. Such an optical fiber has a constant cladding diameter between the cladding diameter of the small-diameter optical fiber 1 and the cladding diameter of the normal optical fiber 2, and has a constant core diameter between the core diameter of the small-diameter optical fiber 1 and the core diameter of the normal optical fiber 2. The use of such a splicing optical fiber enables suitable splicing between the small-diameter optical fiber 1 and the normal optical fiber 2.

First Configuration Example of Optical Coupling Mechanism

Figure 5:
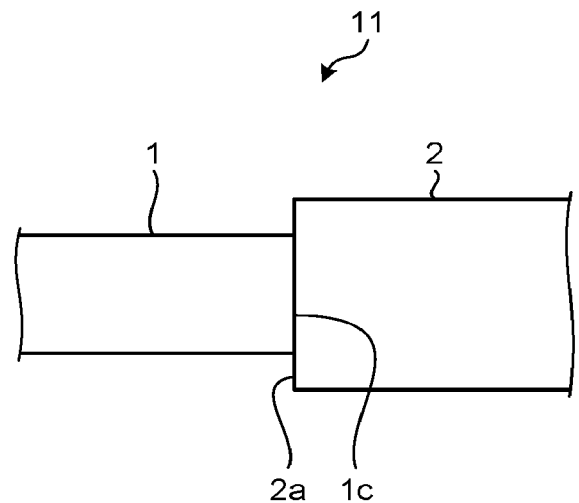
FIG. 5 is a schematic diagram illustrating a first configuration example of an optical coupling mechanism.

The description goes on to various other configuration examples of the optical coupling mechanism. FIG. 5 is a schematic diagram illustrating a first configuration example of an optical coupling mechanism. An optical coupling mechanism 11 includes a splicing portion by fusion of a facet 1c of the small-diameter optical fiber 1 and a facet 2a of the normal optical fiber 2. As is known, such a splicing portion by fusion can be achieved by placing the facet 1c of the small-diameter optical fiber 1 and the facet 2a of the normal optical fiber 2 in close to or in contact with each other, and applying heat by arc discharge or the like to fuse and splice the same together. On that occasion, a thermally-diffused expanded core (TEC) technology may be used to reduce a splicing loss between the small-diameter optical fiber 1 and the normal optical fiber 2. However, the splicing involving TEC sometimes makes the process complicated or increases the size of the device. It is therefore preferable to set an MFD of the small-diameter optical fiber to be the same level (±2 µm) as an MFD of the normal fiber to perform fusion-splicing without the use of TEC. Further, the protective part such as a protective box or a protective tube preferably contains the splicing portion.

Second Configuration Example of Optical Coupling Mechanism

Figure 6:
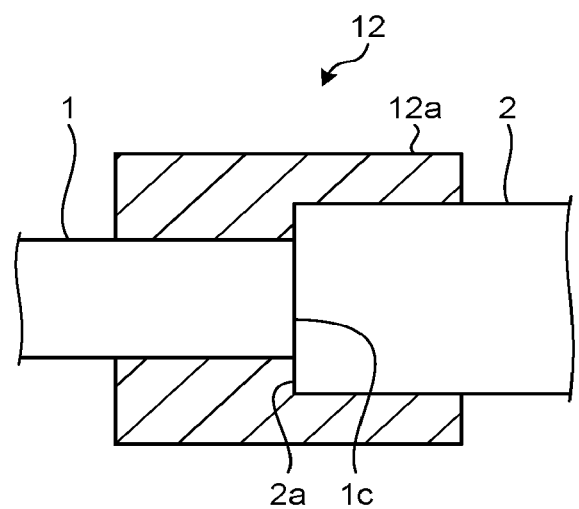
FIG. 6 is a schematic diagram illustrating a second configuration example of an optical coupling mechanism.

FIG. 6 is a schematic diagram illustrating a second configuration example of an optical coupling mechanism. An optical coupling mechanism 12 includes a ferrule 12a that is a mechanical splicing mechanism. Specifically, the optical coupling mechanism 12 is so configured that the small-diameter optical fiber 1 and the normal optical fiber 2 are inserted into the ferrule 12a and are fixed to the ferrule 12a using an adhesive or the like with the facet 1c and the facet 2a in contact with each other. The protective part such as a protective box or a protective tube preferably contains the optical coupling mechanism 12. The optical coupling mechanism 12 may be so formed that the facet 1c and the facet 2a are brought into contact with each other and a fixing member such as a clip for maintaining the contact state therebetween is used to fix the ferrule 12a.

Various patterns can be used as a pitch between the optical fibers of the splicing mechanism for a case where the optical fibers are in a ribbon state, for example, approximately 250 µm that is a pitch of normal optical fiber ribbons, approximately 200 µm that is a pitch of general small-diameter optical fiber ribbons, an outer diameter pitch of coated small-diameter optical fibers, or an intermediate pitch between outer diameter pitches of two coated optical fibers spliced. If the outer diameter pitch of the coated optical fiber is significantly different from the pitch of the mechanical splicing mechanism, then a need arises to bend the normal optical fiber, the small-diameter optical fiber, or both the optical fibers when the optical fiber is inserted into the ferrule to match the pitch. This can lead to a problem such as a bending loss and reduced reliability. In this respect, as a coated optical fiber having a normal diameter, the use of an optical fiber having an outer diameter of 200 µm is more desirable than the use of an optical fiber having an outer diameter of 250 µm. Further, as a pitch of the splicing mechanism, 200 µm, the outer diameter pitch of the coated small-diameter optical fibers, an intermediate pitch between outer diameter pitches of two coated fibers, or the like.

Third Configuration Example of Optical Coupling Mechanism

Figure 7:
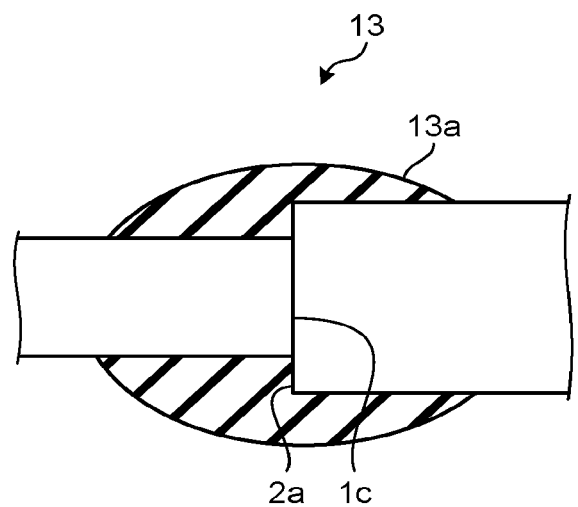
FIG. 7 is a schematic diagram illustrating a third configuration example of an optical coupling mechanism.

FIG. 7 is a schematic diagram illustrating a third configuration example of an optical coupling mechanism. An optical coupling mechanism 13 includes an adhesive 13a that is a mechanical splicing mechanism. The adhesive 13a is made of a resin. Specifically, the optical coupling mechanism 13 is so configured that the facet 1c and the facet 2a contact with each other with the optical axis of the small-diameter optical fiber 1 and the optical axis of the normal optical fiber 2 aligned with each other, and a resin is applied therearound and cured to form the adhesive 13a. The protective part such as a protective box or a protective tube preferably contains the optical coupling mechanism 13.

Fourth Configuration Example of Optical Coupling Mechanism

Figure 8:
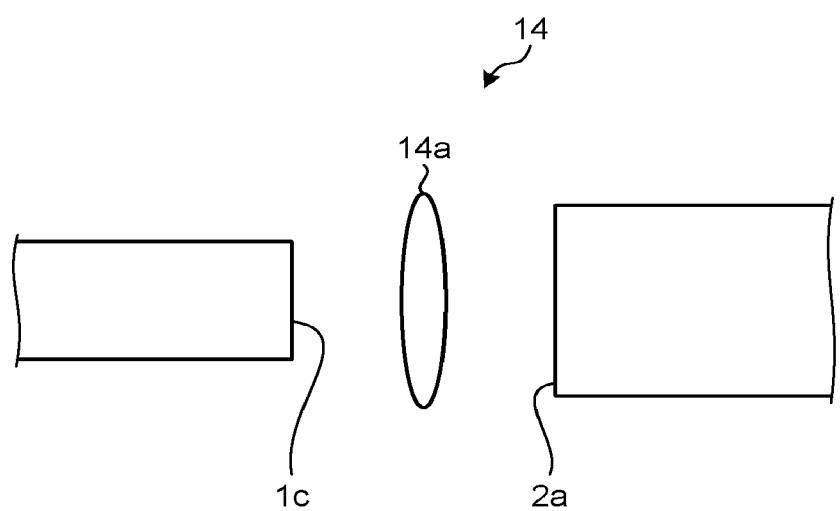
FIG. 8 is a schematic diagram illustrating a fourth configuration example of an optical coupling mechanism.

FIG. 8 is a schematic diagram illustrating a fourth configuration example of an optical coupling mechanism. An optical coupling mechanism 14 includes a lens 14a that is a spatial optical system. Specifically, the optical coupling mechanism 14 is so configured that the lens 14a is placed between the facet 1c of the small-diameter optical fiber 1 and the facet 2a of the normal optical fiber 2 with the optical axis of the small-diameter optical fiber 1 and the optical axis of the normal optical fiber 2 aligned with each other, and a fixture (not illustrated) is used to fix the relative positions of the small-diameter optical fiber 1, the normal optical fiber 2, and the lens 14a. This optically connects the small-diameter optical fiber 1 and the normal optical fiber 2 to each other. The protective part such as a protective box or a protective tube preferably contains the optical coupling mechanism 14.

Fifth Configuration Example of Optical Coupling Mechanism

Figure 9:
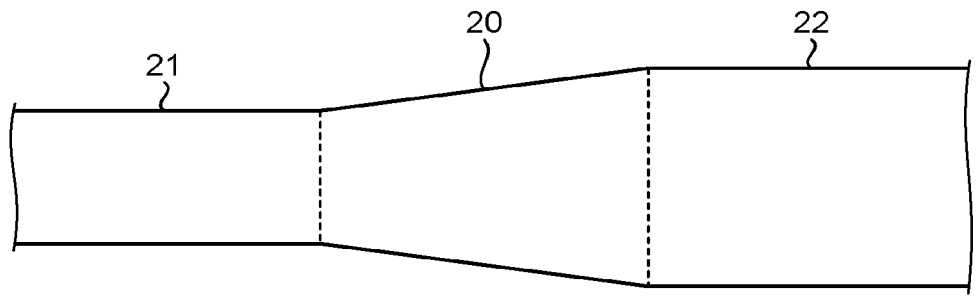
FIG. 9 is a schematic diagram illustrating a fifth configuration example of an optical coupling mechanism.

FIG. 9 is a schematic diagram illustrating a fifth configuration example of an optical coupling mechanism. An optical coupling mechanism 20 includes a part whose cladding diameter changes continuously between a small-diameter optical fiber 21 and a normal optical fiber 22. The optical coupling mechanism 20, the small-diameter optical fiber 21, and the normal optical fiber 22 can be manufactured, for example, as follows: Step (1) first, an optical fiber is drawn from an optical fiber preform to a desired length, for example, several meters to several tens of meters, so as to have the outer diameter of the normal optical fiber 22; Step (2) then, successively, the optical fiber is drawn to a desired length, for example, several meters, so as to have an outer diameter of the optical coupling mechanism 20 which changes continuously; and Step (3) further, successively, the optical fiber is drawn to a desired length, for example, several meters to several tens of kilometers so as to have an outer diameter of the small-diameter optical fiber 21. In this way, the optical coupling mechanism 20 can fabricate an optical fiber having a configuration including the small-diameter optical fiber 21, the normal optical fiber 22, and the optical coupling mechanism 20 whose cladding diameter continuously changes between the small-diameter optical fiber 21 and the normal optical fiber 22. Further, the repetition of Step (1) to Step (3) enables fabrication of a plurality of optical fibers having the configuration described above in succession.

In the embodiments described above, the plurality of small-diameter optical fibers 1 collectively constitutes a ribbon coated optical fiber ribbon core 6; however, the plurality of small-diameter optical fibers 1 may constitute an intermittent adhesive type optical fiber ribbon core.

Figure 10:
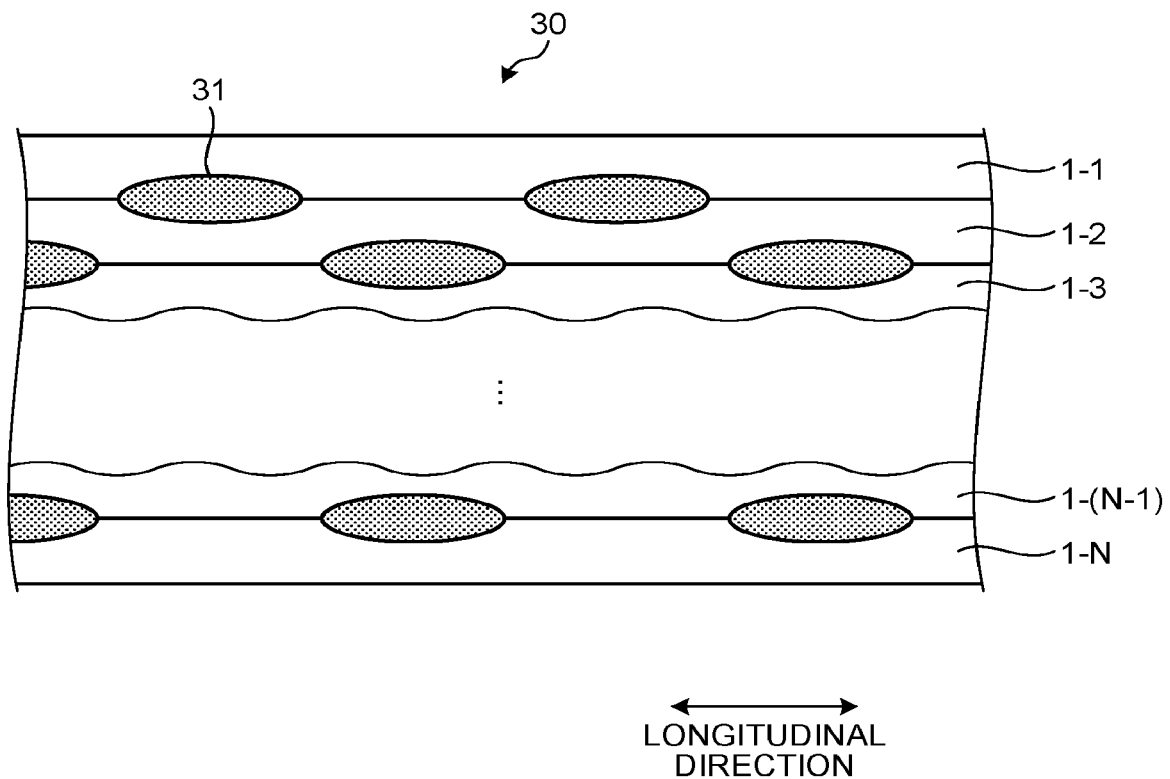
FIG. 10 is a schematic configuration diagram of an intermittent adhesive ribbon core.

FIG. 10 is a schematic configuration diagram of an intermittent adhesive ribbon core 30. The intermittent adhesive ribbon core 30 has a configuration in which adjacent ones of N (N is an integer of two or more, but five or more in this embodiment) small-diameter optical fibers 1-1, 1-2, 1-3, . . . , 1-(N−1), 1-N arranged in parallel are intermittently adhered to each other at a plurality of positions in the longitudinal direction with an adhesive 31. Further, a position, in the longitudinal direction, of the adhesive 31 at which the small-diameter optical fiber 1-1 and the small-diameter optical fiber 1-2 are adhered to each other is different from a position, in the longitudinal direction, of the adhesive 31 at which the small-diameter optical fiber 1-2 and the small-diameter optical fiber 1-3 are adhered to each other. The intermittent adhesive ribbon core 30 of this type is also called a rollable ribbon, and is suitable for increasing the density of the optical fiber cable because the intermittent adhesive ribbon core 30 can improve wire collection density and reduce a transmission loss due to bending.

Sixth Configuration Example of Optical Coupling Mechanism

FIG. 11 is a schematic diagram illustrating a sixth configuration example of an optical coupling mechanism. An optical coupling mechanism 15 is a mechanical splicing mechanism for optically connecting the plurality of small-diameter optical fibers 1 arranged at a predetermined first pitch p and the plurality of normal optical fibers 2 arranged at a predetermined second pitch P to one another via a splicing optical fiber 3A. Each of the plurality of small-diameter optical fibers 1 is coated with a cord coating 8A. The splicing sides of the plurality of small-diameter optical fibers 1 are inserted into a ferrule 15a. On the other hand, each of the plurality of normal optical fibers 2 is coated with a cord coating 8B. The splicing sides of the plurality of normal optical fibers 2 are inserted into a ferrule 15b. The plurality of splicing optical fibers 3A constituting the optical coupling mechanism is inserted into the ferrule 15a so that the pitch on the small-diameter optical fiber 1 side is substantially equal to the first pitch p of the plurality of small-diameter optical fibers 1. The plurality of splicing optical fibers 3A spreads radially from the small-diameter optical fiber 1 toward the normal optical fiber 2, and a pitch of the ferrule 15a at the facet spliced to the normal optical fiber 2 is provided so as to be substantially equal to the second pitch P of the normal optical fiber 2. In other words, the splicing optical fiber 3 is arranged at the first pitch p, which is substantially equal to that of the small-diameter optical fiber 1 on the side of the splicing optical fiber 3 spliced to the small-diameter optical fiber 1, and arranged at the second pitch P, which is substantially equal to that of the normal optical fiber 2 at the facet of the splicing optical fiber 3 spliced to the normal optical fiber 2. The protective part such as a protective box or a protective tube preferably contains the optical coupling mechanism 15.

Hereinafter, an example of the optical fiber cable is described. It is preferable for practical use that a small-diameter optical fiber used in the example is one that conforms to G.652 standard and a leakage loss (also called excess loss) is prevented even if the diameter is reduced. To be specific, a leakage loss of equal to or less than 0.001 dB/km at a wavelength of 1625 nm is preferably achieved, and a zero-dispersion wavelength, dispersion slope, mode field diameter (MFD), cutoff wavelength, and a macrobending loss in the G.652A, G.652B, G.652C, and G.652D standards shown in Table 1 are preferably satisfied.

In Table 1, concerning the macrobending loss, according to G.652A standard, the value is at a wavelength of 1550 nm; however, according to G.652B, G.652C, and G.652D standards, the value is at a wavelength of 1625 nm. In tables below, "E" represents a power of 10, and "5.3E−3" means "$5.3 \times 10^{-3}$", for example.

TABLE 1

| Zero-dispersion wavelength [nm] | Dispersion slope [ps/nm$^2$/km] @Zero-dispersion wavelength | MFD [µm] @1310 nm | Cutoff wavelength [nm] @22 m | Macrobending loss [dB/m@ 60 mm] @1550 nm (B, C, and D are 1625 nm each.) |
|---|---|---|---|---|
| 1300-1324 | ≤0.092 | 8.6-9.5 | ≤1260 | ≤5.3E−3 |

The small-diameter optical fiber used in the example satisfies G.652 standard, which is widely used, and therefore, the small-diameter optical fiber is highly preferable for practical use even if it is a small-diameter optical fiber, and the small-diameter optical fiber used in the example is desirable because it facilitates reduction in the splicing loss with a normal optical fiber. Note that the cladding diameter of the small-diameter optical fiber was examined based on 100 μm, which has a higher merit of diameter reduction from the conventional cladding diameter (approximately 125 μm) of a normal fiber.

In order to meet the standard shown in Table 1, a stepped refractive index profile as illustrated in FIG. 2B was used to perform simulation calculations to optimize the design parameters Δ1 and 2a, and the result shown in Table 2 was obtained. To be specific, it was confirmed that G.652A standard was met by setting, in the small-diameter optical fiber, Δ1 at 0.38% and 2a at 8.0 μm. Further, in Table 2, a critical fiber diameter is the minimum cladding diameter required to obtain a leakage loss equal to or less than 0.001 dB/km at a wavelength of 1625 nm. In Table 2, the critical fiber diameter was 86 μm. To be specific, the simulation calculation confirmed that concerning the small-diameter optical fiber having Δ1 of 0.38% and 2a of 8.0 μm, the leakage loss can be sufficiently prevented if the cladding diameter thereof is 100 μm because the leakage loss is prevented if the cladding diameter is set at 86 μm or more.

TABLE 2

|  | Δ1 [%] | 2a [μm] | Zero-dispersion wavelength [nm] | Dispersion slope [ps/nm²/km] @Zero-dispersion wavelength | MFD [μm] @1310 nm | Cutoff wavelength [nm] @22 m | Macrobending loss [dB/m@ 60 mm] @1550 nm | Critical fiber diameter [μm] |
|---|---|---|---|---|---|---|---|---|
| G.652A standard |  |  | 1300-1324 | ≤0.092 | 8.6-9.5 | ≤260 | ≤5.3E−3 | 1 |
| Simulation | 0.38 | 8.0 | 1320 | 0.085 | 8.7 | 1130 | 1.6E−5 | 86 |

Then, a small-diameter optical fiber was fabricated on the basis of the result of the simulation calculation. The coating on the outer periphery of the cladding portion has a two-layer structure made of a UV curable resin, which is usually used for a normal optical fiber, and the outer diameter of the first (primary) layer near the cladding portion was set at 130 μm, and the outer diameter of the second (secondary) layer was set at 160 μm. In other words, the coated outer diameter of the small-diameter optical fiber is 160 μm, which is smaller, even including the coating, than the coated outer diameter of a normal optical fiber which is 200 μm to 250 μm.

Table 3 shows, in comparison with the simulation result, the measured properties of the small-diameter optical fiber fabricated for use in the examples. The MFD, cutoff wavelength, and macrobending loss were in good agreement with the simulation result. Further, a value of the transmission loss was sufficiently low. In addition, there was no particular leakage loss.

TABLE 3

|  | Transmission loss [dB/km] @1550 nm | MFD [μm] @1310 nm | Cutoff wavelength [nm] @22 m | Macrobending loss [dB/m @60 mm] @1550 nm |
|---|---|---|---|---|
| Simulation | — | 8.7 | 1254 | 1.6E−5 |
| Example | 0.198 | 8.8 | 1260 | 2.3E−5 |

Concerning the MFD of the small-diameter optical fiber, if the difference between the MFD of the small-diameter optical fiber and the MFD of the normal optical fiber is within 2 μm in a wavelength of signal light transmitted via the optical fiber cable, the splicing loss caused by the mismatch of MFD for splicing can be prevented. As the wavelength of the signal light, 1.55 μm band including a wavelength of 1550 nm is the most used; however, the wavelength of the signal light is not limited thereto. The MFD of the fabricated small-diameter optical fiber is 8.8 μm at a wavelength of 1310 nm, which falls within the range of the MFD in G.652A standard. With such a small-diameter optical fiber, the difference between the MFD of the small-diameter optical fiber and the MFD of the normal optical fiber is equal to or less than 2 μm even at a wavelength of 1550 nm.

The plurality of small-diameter optical fibers fabricated in this way were arranged and collectively coated with a ribbon coating to fabricate a plurality of optical fiber ribbon cores. The plurality of optical fiber ribbon cores was then accommodated in a slot having a known configuration to form a sheath, and an optical fiber cable was fabricated. The transmission loss of each of the small-diameter optical fibers of the optical fiber cable was measured, and the measurement indicated that no particular excessive loss occurred as compared with a transmission loss in the optical fiber cable fabricated by accommodating a normal optical fiber having a coating outer diameter of 200 m to 250 μm in a slot with a known configuration. This indicates that a high-density and light-weight optical fiber cable can be achieved using a small-diameter optical fiber fabricated on the basis of the simulation described above, while satisfying G.652A standard.

Then, each of both ends of each small-diameter optical fiber of the optical fiber cable was fusion-spliced to each normal optical fiber of an optical fiber cord with multiple MPO optical connectors. The MFD of each normal optical fiber at a wavelength of 1310 nm was 9.0 μm substantially equal to the MFD of the small-diameter optical fiber.

Fusion-splicing was performed while the splicing loss of each of the small-diameter optical fiber and the normal optical fiber was measured, and the splicing loss thereof at a wavelength of 1550 nm was equal to or less than 0.1 dB, which means a good splicing condition. The fusion-spliced part of each small-diameter optical fiber and each normal optical fiber was covered with a heat-shrinkable protective tube for protection.

The optical fiber cable with an optical fiber cord with an MPO optical connector attached could handle the optical fiber cord with an MPO optical connector that is an end part in the same manner as before, and no particular damage and the like occurred.

In the foregoing embodiments, the normal optical fiber 2 is optically connected to both ends of each of the small-diameter optical fibers 1; however, the normal optical fiber 2 may be optically connected to only one end of the small-diameter optical fiber 1.

In the foregoing embodiments, the optical fiber cable includes a plurality of small-diameter optical fibers and the plurality of small-diameter optical fibers is collectively coated to constitute an optical fiber ribbon core; however, the plurality of small-diameter optical fibers may be in a single core state, or, the optical fiber cable may include both the optical fiber ribbon core and a single core small-diameter optical fiber. The number of small-diameter optical fibers of the optical fiber cable is not particularly limited, and may be one for example.

In the foregoing embodiments, the refractive index profile of the small-diameter optical fiber is a step-type; however may be a so-called W type or a trench type other than the step-type appropriately.

The present disclosure is not limited to the embodiments described above. The present disclosure also includes a combination, as appropriate, of the individual constituent elements described above. In addition, further effects and variations can be easily derived by those skilled in the art. Thus, broader aspects of the present disclosure are not limited to the embodiments described above, and various modifications can be made.

The optical fiber cable according to the present disclosure can be suitably used in the optical communication field.

The present disclosure has an effect of achieving an optical fiber cable that can be increased in density and is easy to handle.

The invention claimed is:

1. An optical fiber cable comprising:
   a small-diameter optical fiber including a core and a cladding portion made of glass and having a cladding diameter of 120 μm or less;
   a normal optical fiber that is optically connected to at least one end of the small-diameter optical fiber, includes a core and a cladding portion made of glass, and has a cladding diameter conforming to a standard of 125 μm;
   an optical coupling mechanism provided between the small-diameter optical fiber and the normal optical fiber; and
   a sheath covering an outer periphery of the small-diameter optical fiber only, among the small-diameter optical fiber and the normal optical fiber, wherein
   the end of the small-diameter optical fiber is positioned outside the sheath,
   the optical coupling mechanism includes a splicing portion by fusion of the small-diameter optical fiber and the normal optical fiber,
   an end of the normal optical fiber other than an end connected to the small-diameter optical fiber has an end portion for connecting to an optical cable,
   no sheath is provided covering the normal optical fiber,
   the sheath is made of polyethylene colored in black, and
   at a wavelength of 1550 nm, a difference between a mode field diameter of the small-diameter optical fiber and a mode field diameter of the normal optical fiber is within 2 μm, wherein each of the small-diameter optical fiber and the normal optical fiber are single mode fibers.

2. The optical fiber cable according to claim 1, comprising a protective part containing the optical coupling mechanism.

3. The optical fiber cable according to claim 1, comprising a cord coating covering an outer periphery of the normal optical fiber.

4. The optical fiber cable according to claim 1, comprising an optical connector provided at an end of the normal optical fiber.

5. The optical fiber cable according to claim 1, wherein the small-diameter optical fiber has a cladding diameter equal to or less than 110 μm.

6. The optical fiber cable according to claim 1, wherein the small-diameter optical fiber has a cladding diameter equal to or less than 100 μm.

7. The optical fiber cable according to claim 1,
   wherein the small diameter optical fiber is one of a plurality of small-diameter optical fibers constituting an optical fiber ribbon core.

8. The optical fiber cable according to claim 1,
   wherein the small diameter optical fiber is one of a plurality of small-diameter optical fibers constituting an intermittent adhesive optical fiber ribbon core.

9. The optical fiber cable according to claim 1, wherein a fiber diameter including a coating of the normal optical fiber is substantially 200 μm.

10. The optical fiber cable according to claim 1, wherein the normal optical fiber has a free end configured to be fusion spliced in the field to a pre-existing normal optical fiber.

* * * * *